(12) United States Patent
Wang et al.

(10) Patent No.: US 10,705,755 B2
(45) Date of Patent: Jul. 7, 2020

(54) METHOD, APPARATUS AND COMPUTER PROGRAM PRODUCT FOR DATA BACKUP

(71) Applicant: EMC IP Holding Company LLC, Hopkinton, MA (US)

(72) Inventors: Yi Wang, Chengdu (CN); Qingxiao Zheng, Chengdu (CN)

(73) Assignee: EMC IP Holding Company LLC, Hopkinton, MA (US)

(*) Notice: Subject to any disclaimer, the term of this patent is extended or adjusted under 35 U.S.C. 154(b) by 30 days.

(21) Appl. No.: 16/117,585

(22) Filed: Aug. 30, 2018

(65) Prior Publication Data
US 2019/0324654 A1 Oct. 24, 2019

(30) Foreign Application Priority Data
Apr. 20, 2018 (CN) .......................... 2018 1 0359621

(51) Int. Cl.
*G06F 3/06* (2006.01)
(52) U.S. Cl.
CPC ............ *G06F 3/065* (2013.01); *G06F 3/0619* (2013.01); *G06F 3/0664* (2013.01); *G06F 3/0673* (2013.01)
(58) Field of Classification Search
CPC ...... G06F 3/065; G06F 3/0619; G06F 3/0664; G06F 3/0673
USPC ........................................................ 711/162
See application file for complete search history.

(56) References Cited

U.S. PATENT DOCUMENTS

| 8,677,355 | B2* | 3/2014 | Spradlin | G06F 11/3636 718/1 |
| 9,098,455 | B2* | 8/2015 | Atluri | G06F 11/1453 |
| 9,720,719 | B2* | 8/2017 | Graham | G06F 9/45558 |
| 10,078,555 | B1* | 9/2018 | Kumar | G06F 16/188 |
| 2017/0270007 | A1* | 9/2017 | Huang | G06F 3/0647 |
| 2019/0108099 | A1* | 4/2019 | Mazumdar | G06F 11/2094 |
| 2019/0179711 | A1* | 6/2019 | Luo | G06F 11/1451 |
| 2019/0179717 | A1* | 6/2019 | Juniwal | G06F 3/067 |

OTHER PUBLICATIONS

Y. Xu, H. Yu and W. Zheng, "A Consistent Backup Mechanism for Disaster Recovery that Using Container Based Virtualization," 2012 Seventh ChinaGrid Annual Conference, Beijing, 2012, pp. 95-100, doi: 10.1109/ChinaGrid.2012.10.*

(Continued)

*Primary Examiner* — Pierre Miche Bataille
(74) *Attorney, Agent, or Firm* — Chamberlain, Hrdlicka, White, Williams & Aughtry

(57) ABSTRACT

Embodiments of the present disclosure provide a method, apparatus and computer program product for data backup. A method includes obtaining first information about data change in a virtual disk, where the first information indicates that data in at least one block of a plurality of blocks is changed. The method also includes determining, based on the first information, second information about a location of the at least one block in the virtual disk. The method further includes obtaining a first size of the virtual disk backed up to a backup server prior to the data change and a second size of the virtual disk subsequent to the data change. In addition, the method includes generating, based on the second information, the first size and the second size, incremental backup data for backing up the virtual disk having the second size to the backup server.

15 Claims, 6 Drawing Sheets

(56) References Cited

OTHER PUBLICATIONS

R. Akbar, M. S. Husain and M. Suaib, "Comparative study of various backup and monitoring techniques," 2015 International Conference on Green Computing and Internet of Things (ICGCIoT), Noida, 2015, pp. 1530-1537, doi: 10.1109/ICGCIoT.2015.7380710.*

M. Kaczmarski, T. Jiang and D. A. Pease, "Beyond backup toward storage management," in IBM Systems Journal, vol. 42, No. 2, pp. 322-337, 2003, doi: 10.1147/sj.422.0322.*

\* cited by examiner

METHOD, APPARATUS AND COMPUTER PROGRAM PRODUCT FOR DATA BACKUP

FIELD

Embodiments of the present disclosure generally relate to the field of data storage and particularly relate to a method, an apparatus and a computer program product for data backup.

BACKGROUND

In a virtual machine system, a virtual disk acts as a storage device and is stored as an image file in the virtual machine. There are generally two types of virtual disks, i.e. a virtual disk with a fixed size and a virtual disk with an expandable size. The size of an image file of the virtual disk with a fixed size is fixed and will not be changed as the data is written. The size of the image file of the virtual disk with the expandable size will grow with the data write.

In order to prevent the data loss incurred by an error(s) or failure of the virtual machine system or a system failure, data in the virtual disk is typically backed up to other storage media. For example, every time data is written to the virtual disk or when the data in the virtual disk is changed, all the data in the image file of the virtual disk can be backed up to other storage media. However, such a full backup may result in the transmission of a large amount of duplicate data. To solve this problem, the full backup may be performed at an initial phase for the virtual disk and, when the data is changed, only an incremental backup is performed for the changed data. Nonetheless, such an incremental backup may be applicable only to a virtual disk with a fixed size, rather than a virtual disk with an expandable size.

SUMMARY

Embodiments of the present disclosure provide a method, an apparatus and a computer program product for data backup.

In general, in one aspect, the present disclosure provides a method of data backup. The method comprises obtaining first information about data change in a virtual disk, the virtual disk comprising a plurality of blocks, and the first information indicating that respective data in at least one block of the plurality of blocks is changed. The method also comprises determining, based on the first information, second information about a respective location of the at least one block in the virtual disk. The method further comprises obtaining a first size of the virtual disk backed up to a backup server prior to the data change and a second size of the virtual disk subsequent to the data change. In addition, the method comprises generating, based on the second information, the first size and the second size, incremental backup data for backing up the virtual disk having the second size to the backup server.

In general, in one aspect, the present disclosure provides an apparatus of managing dedicated processing resources. The apparatus comprises at least one processing unit and at least one memory. The at least one memory is coupled to the at least one processing unit and storing instructions for execution by the at least one processing unit. The instructions, when executed by the at least one processing unit, causes the apparatus to perform a method, and the method comprising obtaining first information about data change in a virtual disk, the virtual disk comprising a plurality of blocks, and the first information indicating that respective data in at least one block of the plurality of blocks is changed. The method further comprises: determining, based on the first information, second information about a respective location of the at least one block in the virtual disk; obtaining a first size of the virtual disk backed up to a backup server prior to the data change and a second size of the virtual disk subsequent to the data change; and generating, based on the second information, the first size and the second size, incremental backup data for backing up the virtual disk having the second size to the backup server.

In general, in one aspect, the present disclosure provides a computer program product. The computer program product is tangibly stored in a non-transient computer storage medium and includes a machine executable instruction. The machine executable instruction, when executed, causes the machine to perform any step of the method according to one or more embodiments of the present disclosure.

This Summary is provided to introduce a selection of concepts in a simplified form that are further described below in the Detailed Description. This Summary is not intended to identify key features or essential features of the claimed subject matter, nor is it intended to be used to limit the scope of the present disclosure.

BRIEF DESCRIPTION OF THE DRAWINGS

The above and other objectives, features and advantages of the present disclosure will become more apparent, through more detailed description of the exemplary embodiments of the present disclosure with reference to the accompanying drawings, in which the same reference numerals generally represent the same parts.

Throughout the drawings, the same or corresponding reference numerals refer to the same or corresponding parts.

DETAILED DESCRIPTION OF EMBODIMENTS

Figure 1:
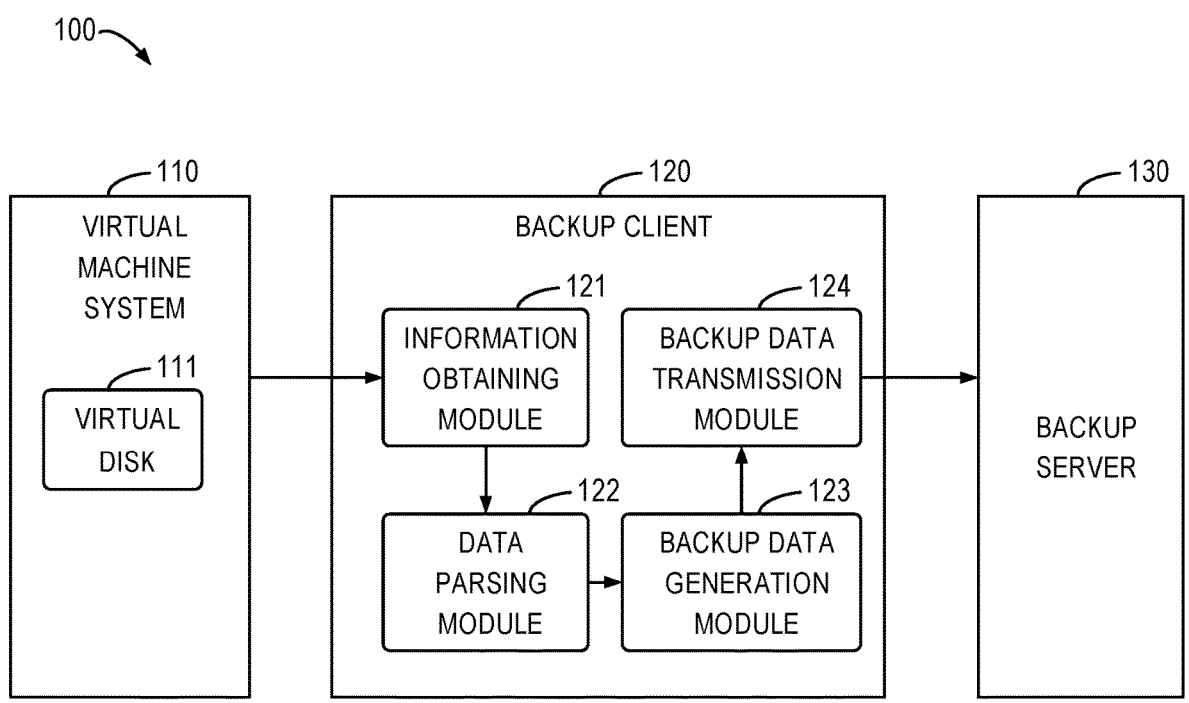
FIG. 1 illustrates a schematic diagram of an environment in which some embodiments of the present disclosure may be implemented.

Preferred embodiments of the present disclosure will be described in more detail hereinafter with reference to the drawings. Though the preferred embodiments of the present disclosure have been illustrated in the drawings, however, it should be appreciated that the present disclosure may be implemented in various manners but should not be limited by the embodiments as described herein. Rather, these embodiments are provided to disclose the present disclosure more thoroughly and completely, and to fully convey the scope of the present disclosure to those skilled in the art.

As used herein, the term "include" and its variants are to be read as open-ended terms that mean "includes, but is not limited to". The term "or" is to be read as "and/or" unless the context clearly indicates otherwise. The term "based on" is to be read as "based at least in part on". The term "an example embodiment" and "an embodiment" are to be read as "at least one example embodiment". The term "another embodiment" is to be read as at least one further embodiment". The term "first", "second" or the like can represent the different or the same object. Other definitions, either explicit or implicit, may be included below.

As described above, in order to prevent the data loss incurred by an error(s) or failure of the virtual machine system or a system failure, i back up data in a virtual disk is typically backed up to other storage media. For example, when the data is written to a virtual disk or when the data in a virtual disk is changed, all the data in the image file of the virtual disk can be backed up to other storage media. However, such a full backup may result in the transmission of a large amount of duplicate data. To solve this problem, the full backup may be performed at an initial phase for the virtual disk and when the data is changed, only an incremental backup is performed for the changed data. Nonetheless, such an incremental backup may be applicable only to a virtual disk with a fixed size, rather than a virtual disk with an expandable size.

The example embodiments of the present application provide a one or more solutions for data backup. These solutions may implement incremental backup for a virtual disk with an expandable size, so as to reduce an amount of data that is required to be backed up for a virtual disk. In one embodiment, an unchanged block in the virtual disk, a reference is used to avoid storing the repeated data in a backup server. Because the incremental backup only processes the changed block, the time required for backup may be shorted and the unnecessary data transmission may be reduced. In a shared networking environment, particularly a cloud-based environment, less data transmission is helpful to reduce the overall expenses of the network.

FIG. 1 illustrates a schematic diagram of an example environment 100 in which embodiments of the present disclosure may be implemented. As shown in FIG. 1, in general, the environment 100 may include a virtual machine system 110, a backup client 120 and a backup server 130. It would be appreciated that the structure and function of the example environment 100 are only described for illustrative purpose, without implying any limitation to the scope of the present disclosure. Embodiments of the present disclosure are also applicable to an environment having a different structure and/or function.

The virtual machine system 110 may be any virtual machine system already known or to be developed in the future, for example, but not limited to, a Hyper-V system of Microsoft, VMware virtual machine system or the like. However, it would be appreciated that this is only provided as an example, without any intention to limit the scope of the present disclosure. Embodiments of the present disclosure are also applicable to virtual machine systems other than the Hyper-V systems.

As shown in FIG. 1, the virtual machine system 110 may include one or more virtual disks 111. In the virtual machine system 110, each virtual disk 111 may be used as a storage device and stored as an image file in the virtual machine system 110. The virtual disk 111 may be one of the following two types: a virtual disk with a fixed size and a virtual disk with an expandable size. The size of the image file of the virtual disk with the fixed size is fixed, which will not change as the data is written to the virtual disk. The size of the image file of the virtual disk with the expandable size will grow as the data is written to the virtual disk. The virtual disk 111 may be typically divided into a plurality of disk blocks (which are also referred to as "blocks" in this context). When data in the virtual disk 111 is changed, the virtual machine system 110 may typically provide a particular manner to identify the blocks of the virtual disk 111 in which the data has changed. If the virtual machine is a Hyper-V system, then specific manner is referred to as Resilient Change Tracking (RCT).

A backup client 120 is configured to back up data in the virtual disk 111 to the backup server 130. As shown in FIG. 1, the backup client 120 may include an information obtaining module 121, a data parsing module 122, a backup data generation module 123 and a backup data transmission module 124. It is assumed herein that, prior to data change in the virtual disk 111, the backup client 120 has backed up the data in the virtual disk 111 to a backup server 130, and that the backup data is referred to as "basic backup data."

When the data in the virtual disk 111 is changed, the information obtaining module 121 may obtain information (which is also referred to as "first information") about the data change in the virtual disk 111 from the virtual machine system 110. If the virtual machine is a Hyper-V system, then information obtaining module 121 may obtain the first information by calling a RCT Application Program Interface (API). The first information may indicate the blocks of the virtual disk 111 in which the data is changed and may provide the changed contents. Additionally, the information obtaining module 121 may obtain information about the size of the virtual disk 111 from the virtual machine system 110. In some embodiments, the virtual disk 111 has a fixed size. That is, the size of the virtual disk 111 remains unchanged prior to and subsequent to the data change in the virtual disk 111. In some other embodiments, the virtual disk 111 may have a variable size. For example, as the data in the virtual disk 111 is changed, the size of the virtual disk may be increased. By obtaining information about the size of the virtual disk 111, the information obtaining module 121 may determine the sizes of the virtual disk 111 prior to and subsequent to the data change in the virtual disk 111 (in this context, the sizes of the virtual disk 111 prior to and subsequent to the data change are referred to as "a first size" and "a second size", respectively).

The data parsing module 122 may parse the first information to determine location information of at least one block in the virtual disk 111 that has changed in the virtual disk, (which is referred to as "second information"). For example, the second information may indicate a size of each changed block i in the virtual disk 111, a start location and an end location of the block, or the like. In addition, the data parsing module 122 may transfer, to the backup data generation module 123, the determined location information and the information about the size of the virtual disk 111 obtained by the information obtaining module 121 (for example, the first size and the second size), so as to generate incremental backup data for the virtual disk 111 having the second size.

The backup data generation module 123 can, based on the location information determined by the data parsing module 122 and the information about the size of the virtual disk 111, generate incremental backup data for backing up the virtual disk 111.

In some embodiments, the virtual disk 111 is a virtual disk having a fixed size, and the first size is thus equal to the second size. Under this circumstance, for those unchanged blocks in the virtual disk 111, the backup data generating module 123 may only generate references to the respective blocks in the basic backup data, and include them in the incremental backup data. That is, the backup data generation module 123 does not need to include the data in these blocks in the incremental backup data, and thus the data amount of the backup data to be transferred can be reduced. Additionally, the backup data generation module 123 may include the contents of the at least one changed block of the virtual disk 111 in the incremental backup data.

In some embodiments, the virtual disk 111 is a virtual disk with an expandable size, and the first size is less than the second size. Under this circumstance, the backup data generation module 123 can, based on the first size, determine an end location of the virtual disk 111 prior to data change (which is also referred to as "a first end location" in the context). For example, the first end location may indicate the number of blocks included in the virtual disk 111 prior to the data change. The backup data generation module 123 can, based on the second size, determine an end location of the virtual disk 111 subsequent to the data change (which is also referred to as "a second end location" in the context). For example, the second end location may indicate the number of blocks included in the virtual disk 111 subsequent to the data change. Because the second size is greater than the first size, the second end location follows the first end location. The backup data generation module 123 may generate the incremental backup data further based on the location information determined by the data parsing module 122, the first end location and the second end location.

In some embodiments, because the size of the virtual disk 111 may change, there may be blocks absent both in the basic backup data and in the at least one changed block. For those blocks unchanged in the virtual disk 111 (that is, the blocks included in the basic backup data but absent in the at least one changed block), the backup data generation module 123 may only generate references of the respective blocks in the basic backup data and include them in the incremental backup data. That is, the backup data generation module 123 does not need to include the data in these blocks in the incremental backup data, and thus the data amount of the backup data to be transferred can be reduced. For a block in the virtual disk 111 absent both in the basic backup data and in the at least one changed block, the backup data generation module 123 may generate an indication to fill the block with a predetermined value (for example, zero), and the indication is included in the incremental backup data. Additionally, the backup data generation module 123 may include the contents of the at least one changed block of the virtual disk 111 in the incremental backup data.

The backup data generation module 123 may transfer the generated incremental backup data to a backup data transmission module 124, and the backup data transmission module 124 may transmit the same to the backup server 130, so as to implement the backup of the virtual disk 111 having the second size. Detailed description will be provided hereinafter in combination with the service and the specific examples.

Figure 2:
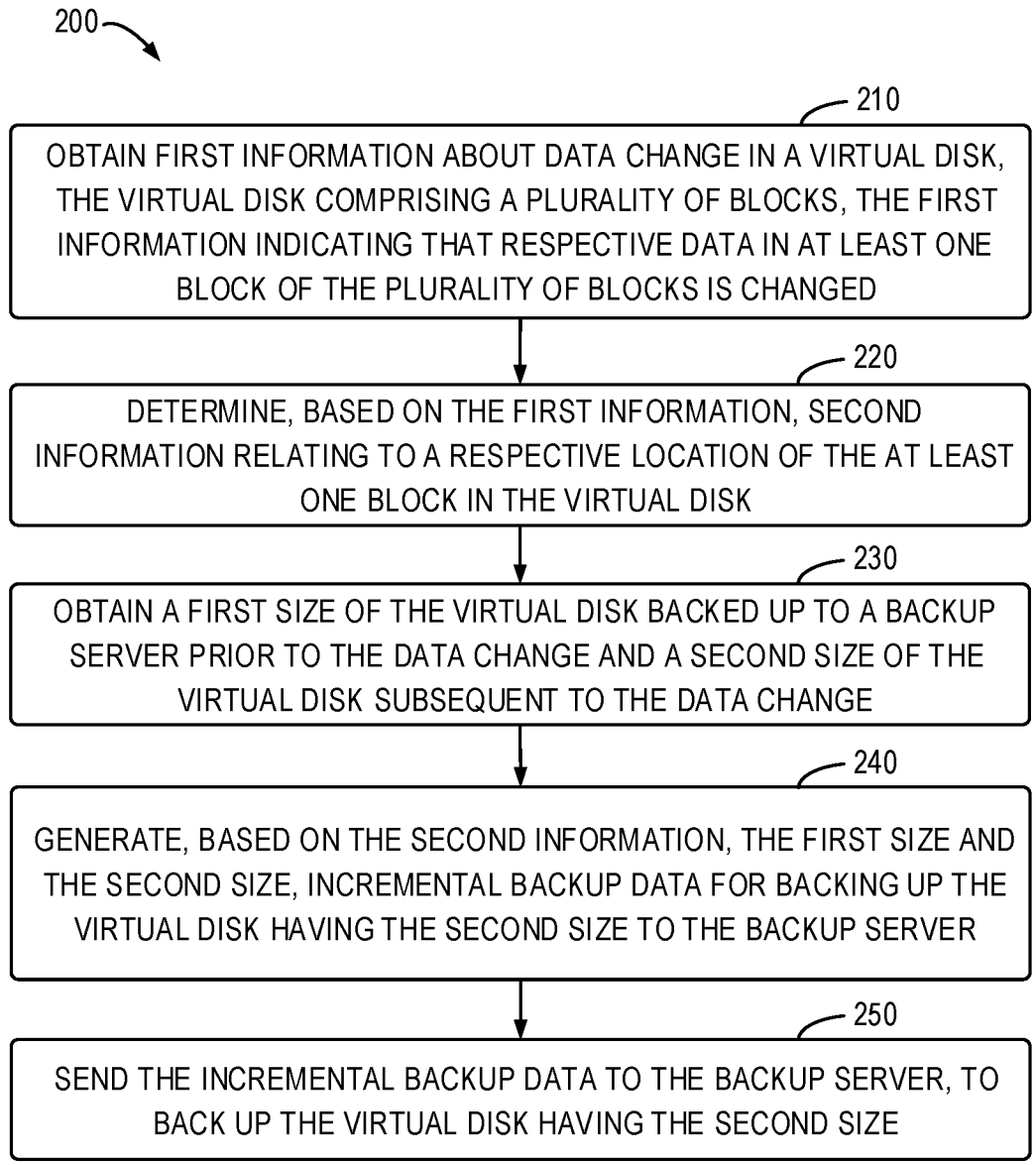
FIG. 2 illustrates a flowchart of a method of backing up data according to embodiments of the present disclosure.

FIG. 2 illustrates a flowchart of a method 200 of backing up data according to embodiments of the present disclosure. For example, the method 200 may be performed by a backup client 120 as illustrated in FIG. 1. Various acts (or steps) in the method 200 will be described hereinafter in detail with reference to FIG. 1. It is to be understood that the method 200 may include additional acts (or steps) not shown and/or skip the shown acts (or steps), and the scope of the present disclosure is not limited in this aspect.

At block 210, the backup client 120 obtains first information about data change in the virtual disk 111. In some embodiments, the virtual disk 111 may include a plurality of blocks, and the first information may indicate that data in the at least one block of the plurality of blocks is changed. In some embodiments, for example, the first information about data change in the virtual disk 111 may be obtained from the virtual machine system 110 by the information obtaining module 121 in the backup client 120. If the virtual machine is a Hyper-V system, then information obtaining module 121 may obtain the first information by calling the RCT API. For example, the first information may indicate the blocks in the virtual disk 111 for which the data is changed and provide the changed contents.

At block 220, the backup client 120 determines, based on the first information, second information about a respective location of the at least one block in the virtual disk 111. In some embodiments, the data parsing module 122 in the backup client 120 parses the first information, so as to determine location information of the at least one block in the virtual disk 111, which is changed in the virtual disk (i.e., second information). For example, the second information may indicate a size of each block in the at least one changed block in the virtual disk 111, a start location and an end location of the block, or the like.

At block 230, the backup client 120 obtains a first size of the virtual disk 111 backed up to the backup server 130 prior to the data change and a second size of the virtual disk 111 subsequent to the data change. In some embodiments, the information about the size of the virtual disk 111 may be obtained by the information obtaining module 121 in the backup client 120 from the virtual machine system 110. In some embodiments, the virtual disk 111 has a fixed size. That is, prior to and subsequent to the data change in the virtual disk 111, the size of the virtual disk 111 remains unchanged, and hence, the first size is equal to the second size. In some other embodiments, the virtual disk 111 may have a variable size. For example, as the data in the virtual disk 111 is changed, the size of the virtual disk may be increased, and the first size thus is less than the second size.

At block 240, the backup client 120 generates, based on the second information, the first size and the second size, the incremental backup data for backing up the virtual disk 111 having the second size to the backup server 130. In some embodiments, the backup data generation module 123 in the backup client 120 may generate the incremental backup data for backing up the virtual disk 111 having the second size.

In some embodiments, the virtual disk 111 is a virtual disk having a fixed size, and the first size thus is equal to the second size. Under this circumstance, for those blocks unchanged in the virtual disk 111, the backup data generation module 123 may generate only references to the respective blocks in the basic backup data, and include them in the incremental backup data. That is, the backup data generation module 123 does not need to include the data in these blocks in the incremental backup, and therefore the data amount of the backup data to be transferred may be reduced. In addition, the backup data generation module 123 may include the contents of the at least changed block of the virtual disk 111 in the incremental backup data.

Figure 3:
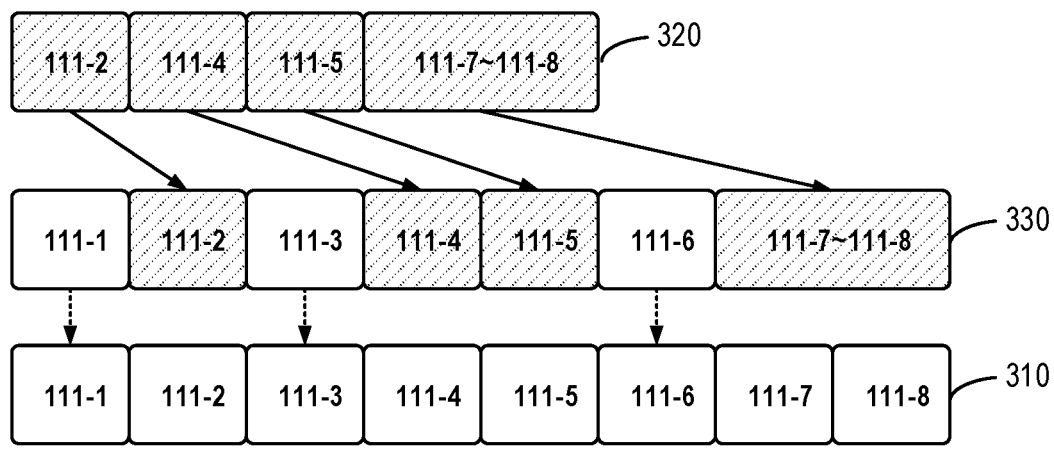
FIG. 3 illustrates a schematic diagram of backing up a virtual disk with a fixed size according to some embodiments of the present disclosure.

FIG. 3 illustrates an example of such embodiments. For example, as shown in FIG. 3, the backup client 120 has backed up the data in the virtual disk 111 to the backup server 130 prior to the data change in the virtual disk 111, as shown by the basic backup data 310 in FIG. 3. The basic backup data 310 may include respective contents in the blocks 111-1 to 111-8 in the virtual disk 111. FIG. 3 further illustrates first information 320 obtained by the information obtaining module 121 in the backup client 120 from the virtual machine system 110. The first information 320 indicates that the blocks 111-2, 111-4, 111-5 and 111-7 to 111-8 in the virtual disk 111 are changed. Under this circumstance, the backup data generation module 123 may generate incremental backup data 330. For example, for the blocks 111-1, 111-3 and 111-6 unchanged in the virtual disk 111, the generated incremental backup data 330 may only include a reference to the respective contents of these blocks in the basic backup data 310, as indicated by dotted arrows as shown in FIG. 3. For the blocks 111-2, 111-4, 111-5 and 111-7 to 111-8 changed in the virtual disk 111, the generated incremental backup data 330 may include the changed contents of these blocks, as indicated by solid arrows as shown in FIG. 3. In this way, the embodiments of the present disclosure can reduce the data amount of the backup data to be transferred.

In some embodiments, the virtual disk 111 is a virtual disk with an expandable size, and the first size is less than the second size. Under this circumstance, the backup data generation module 123 may determine, based on the first size, the first end location of the virtual disk 111 prior to the data change, which indicates the number of blocks included in the virtual disk 111 prior to the data change. The backup data generation module 123 may determine, based on the second size, the second end location of the virtual disk 111 subsequent to the data change, which indicates the number of blocks included in the virtual disk 111 subsequent to the data change. The backup data generation module 123 may generate the incremental backup data further based on the location information determined by the data parsing module 122, the first end location and the second end location.

In some embodiments, because the size of the virtual disk 111 may change, there may be blocks absent both in the basic backup data and in the block of the at least one changed block. For those blocks unchanged in the virtual disk 111 (i.e., the blocks included in the basic backup data but absent in the at least one changed block), the backup data generation module 123 may generate only references to a respective block in the basic backup data, and include them in the incremental backup data. That is, the backup data generation module 123 does not need to include the data in these blocks in the incremental backup data, and therefore can reduce the data amount of the backup data to be transferred. For the blocks in the virtual disk 111 included neither in the basic backup data nor in the block of the at least one changed block, the backup data generation module 123 may generate an indication to fill the block with a predetermined value (for example, zero), and the indication is included in the incremental backup data. Additionally, the backup data generation module 123 may include the contents of the at least one changed block of the virtual disk 111 in the incremental backup data.

Figure 4A:
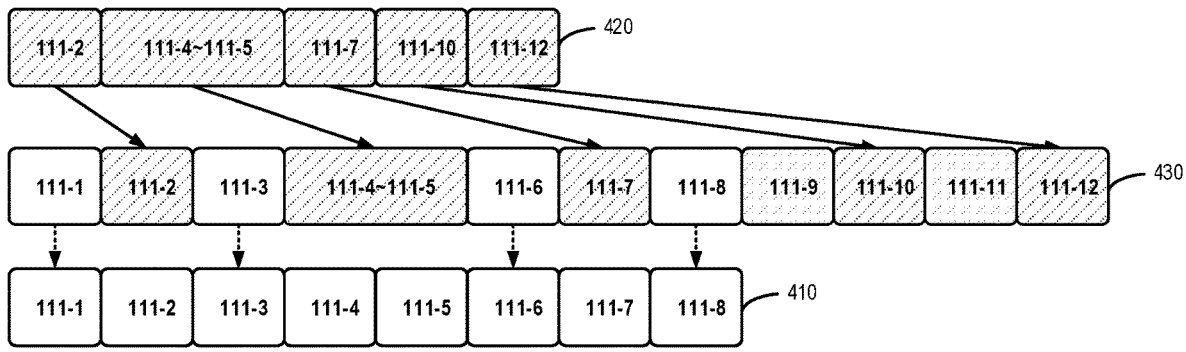
FIGS. 4a-4c illustrate schematic diagrams of backing up an expandable virtual disk according to some embodiments of the present disclosure.

FIG. 4a illustrates an example of such embodiments. As shown in FIG. 4a, for example, the backup client 120 has backed up the data in the virtual disk 111 to the backup server 130 prior to the data change in the virtual disk 111, as shown by the basic backup data 410 in FIG. 4a. The basic backup data 410 may include respective contents in the blocks 111-1 to 111-8 of the virtual disk 111.

FIG. 4a further illustrates first information 420 obtained by the information obtaining module 121 in the backup client 120 from the virtual machine system 110. The first information 420 indicates that the blocks 111-2, 111-4 to 111-5, 111-7, 111-10 and 111-12 in the virtual disk 111 are changed. The backup data generation module 123 may, based on the second size of the virtual disk 111, determine that the number of blocks included in the virtual disk 111 subsequent to the data change is 12. That is, the blocks 111-9 and 111-11 are absent both in the basic backup data 410 and in the blocks 111-2, 111-4 to 111-5, 111-7, 111-10 and 111-12 that are changed. Under this circumstance, the backup data generation module 123 may generate incremental backup data 430.

Specifically, for the blocks 111-1 to 111-8, the backup data generation module 123 may generate the incremental backup data in a manner similar to that as shown in FIG. 3. That is, for the blocks 111-1, 111-3, 111-6 and 111-8 unchanged in the virtual disk 111, the generated incremental backup data 430 may only include a reference to respective contents of these blocks in the basic backup data 410, as indicated by dotted arrows as shown in FIG. 4a. For the blocks 111-2, 111-4 to 111-5 and 111-7 changed in the virtual disk 111, the generated incremental backup data 430 may include the changed contents of these blocks, as indicated by dotted arrows as shown in FIG. 4a. For the blocks 111-9, 111-10, 111-11 and 111-12 not involved in the basic backup data 410, since the first information 420 indicates that the data in the blocks 111-10 and 111-12 is changed, the generated incremental backup data 430 may include the changed contents of these blocks, as indicated by the solid arrows as shown in FIG. 4a). For the blocks 111-9 and 111-11 absent both in the basic backup data 410 and in the changed blocks, the generated incremental backup data 430 may include an indication to fill these blocks, respectively, with a predetermined value (for example, zero).

Figure 4B:
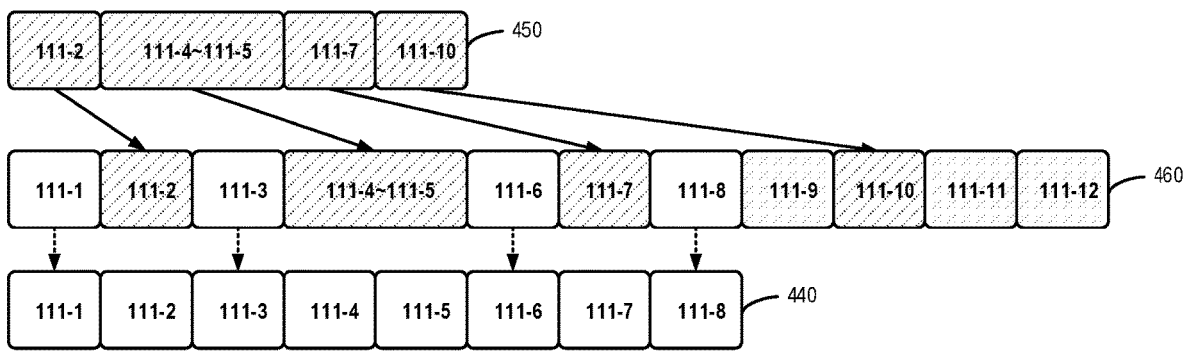

FIG. 4b illustrates a further example of such embodiments. As shown in FIG. 4b, for example, prior to the data change in the virtual disk 111, the backup client 120 has backed up the data in the virtual disk 111 to the backup server 130, as shown by the basic backup data 440 in FIG. 4b. The basic backup data 440 may include respective contents in the blocks 111-1 to 111-8 in the virtual disk 111.

FIG. 4b further illustrates first information 450 obtained by the information obtaining module 121 in the backup client 120 from the virtual machine system 110. The first information 450 indicates that the blocks 111-2, 111-4 to 111-5, 111-7 and 111-10 in the virtual disk 111 are changed. In addition, the backup data generation module 123 may, based on the second size of the virtual disk 111, determine the number of blocks included in the virtual disk 111 subsequent to the data change is 12. That is, the blocks 111-9, 111-11 and 111-12 are absent both in the basic backup data 440 and in the blocks 111-2, 111-4 to 111-5, 111-7 and 111-10 that are changed. Under this circumstance, the backup data generation module 123 may generate the incremental backup data 460.

Specifically, for the blocks 111-1 to 111-8, the backup data generation module 123 may generate the incremental backup data in the manner similar to that as shown in FIG. 3. That is, for the blocks 111-1, 111-3, 111-6 and 111-8 unchanged in the virtual disk 111, the generated incremental backup data 460 may only include a reference to respective contents of these blocks in the basic backup data 410, as indicated by dotted arrows as shown in FIG. 4b. For the blocks 111-2, 111-4 to 111-5 and 111-7 changed in the virtual disk 111, the generated incremental backup data 460 may include the changed contents of these blocks, as indicated by solid arrows as shown in FIG. 4b. For the blocks 111-9, 111-10, 111-11 and 111-12 not involved in the basic backup data 440, since the first information 450 indicates that the data in the block 111-10 is changed, the generated incremental backup data 460 may include the changed content of the block 111-10, which is indicated by the solid arrow as shown in FIG. 4b. For the blocks 111-9, 111-11 and 111-12 absent both in the basic backup data 440 and in the changed blocks, the generated incremental backup data 460 may include an indication to fill these blocks, respectively, with a predetermined value (for example, zero).

Figure 4C:
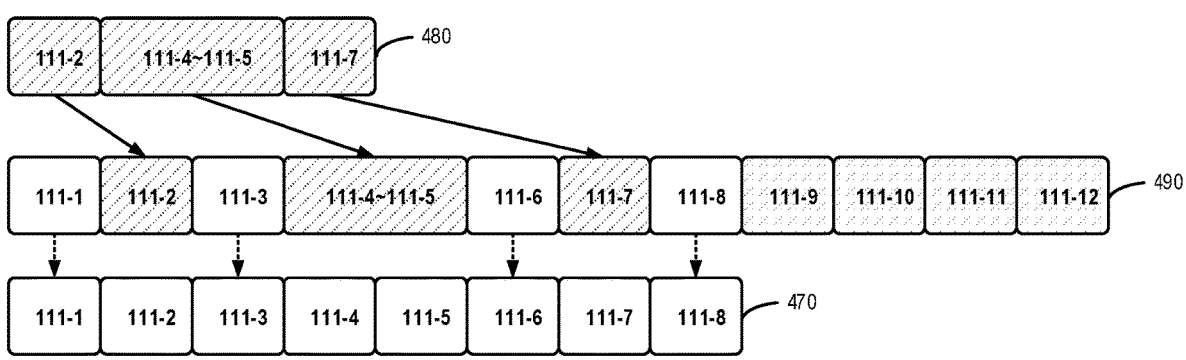

FIG. 4c illustrates another example of such embodiments. As shown in FIG. 4c, for example, prior to the data change in the virtual disk 111, the backup client 120 has backed up the data in the virtual disk 111 to the backup server 130, as shown by the basic backup data 470 in FIG. 4c. The basic backup data 470 may include respective contents in the blocks 111-1 to 111-8 in the virtual disk 111.

FIG. 4c further illustrates first information 480 obtained by the information obtaining module 121 in the backup client 120 from the virtual machine system 110. The first information 480 indicates that the blocks 111-2, 111-4 to 111-5 and 111-7 in the virtual disk 111 are changed. Additionally, the backup data generation module 123 may, based on the second size of the virtual disk 111, determine the number of blocks included in the virtual disk 111 subsequent to the data change is 12. That is, the blocks 111-9, 111-10, 111-11 and 111-12 are absent both in the basic backup data 470 and in the blocks 111-2, 111-4 to 111-5 and 111-7 that are changed. Under this circumstance, the backup data generation module 123 may generate incremental backup data 490.

Specifically, for the blocks 111-1 to 111-8, the backup data generation module 123 may generate the incremental backup data in the manner similar to that as shown in FIG. 3. That is, for the blocks 111-1, 111-3, 111-6 and 111-8 unchanged in the virtual disk 111, the generated incremental backup data 490 may only include a reference to respective contents of these blocks in the basic backup data 410, as indicated by the dotted arrow as shown in FIG. 4c. For the blocks 111-2, 111-4 to 111-5 and 111-7 in the virtual disk 111, the generated incremental backup data 490 may include the changed contents of these blocks, as indicated by the solid arrows as shown in FIG. 4c. For the blocks 111-9, 111-10, 111-11 and 111-12 neither involved in the basic backup data 470 nor indicated by the first information 480, the generated incremental backup data 490 may include an indication to fill these blocks, respectively, with a predetermined value (for example, zero).

Returning to FIG. 2, additionally or alternatively, the backup client 120 transmits, at block 250, the incremental backup data to the backup server 130 to back up the virtual disk 111 having a second size. In response to receiving the incremental backup data, the backup server 130 may perform synthesis based on the basic backup data and the incremental backup data, to obtain and store final backup data for the virtual disk 111 having the second size.

As discussed above, for those blocks absent both in the basic backup data and in those blocks of the changed blocks, the incremental backup data transmitted by the backup client 120 to the backup server 130 may include an indication to fill these blocks, respectively, with a predetermined value (for example, zero). In some embodiments, the backup client 120 may use a buffer filled with the predetermined value to transmit the above indication.

In one embodiment, the plurality of blocks is filled with the predetermined value has a size of 640 KB. In some embodiments, in order to avoid consuming the memory too much, two types of buffers filled with the predetermined value may be used to transmit an indication to fill the block having a size of 640 KB. The two types of buffers include: a first buffer having a predetermined size and a second buffer having a size less than the predetermined size. For the above example, the size of the first buffer may be 64 KB, which can be used repeatedly; and the size of the second buffer may be less than 64 KB. Supposing that an initial value of a transmission counter maintained by the backup client 120 is 640 KB, the value of the transmission counter can be reduced by 64 KB every time when the first buffer filled with the predetermined value is used for transmission to the backup server 130. When the first buffer filled with the predetermined value is used for transmission to the backup server 130 for 1000 times, the value of the transmission counter is 10 KB. At this time, the backup client 120 can dynamically allocate the second buffer having a size of 10 KB and fill the second buffer with a predetermined value, for transmission to the backup server 130.

At a side of the backup server 130, the received 640 KB-sized data filled with the predetermined value may be stored in a deduplication manner. In this way, the final backup data for the virtual disk 111 having a second size stored on the backup server 130 may be far less than the actual size of the virtual disk 111, such that the storage of the backup server 130 is saved.

Figure 5:
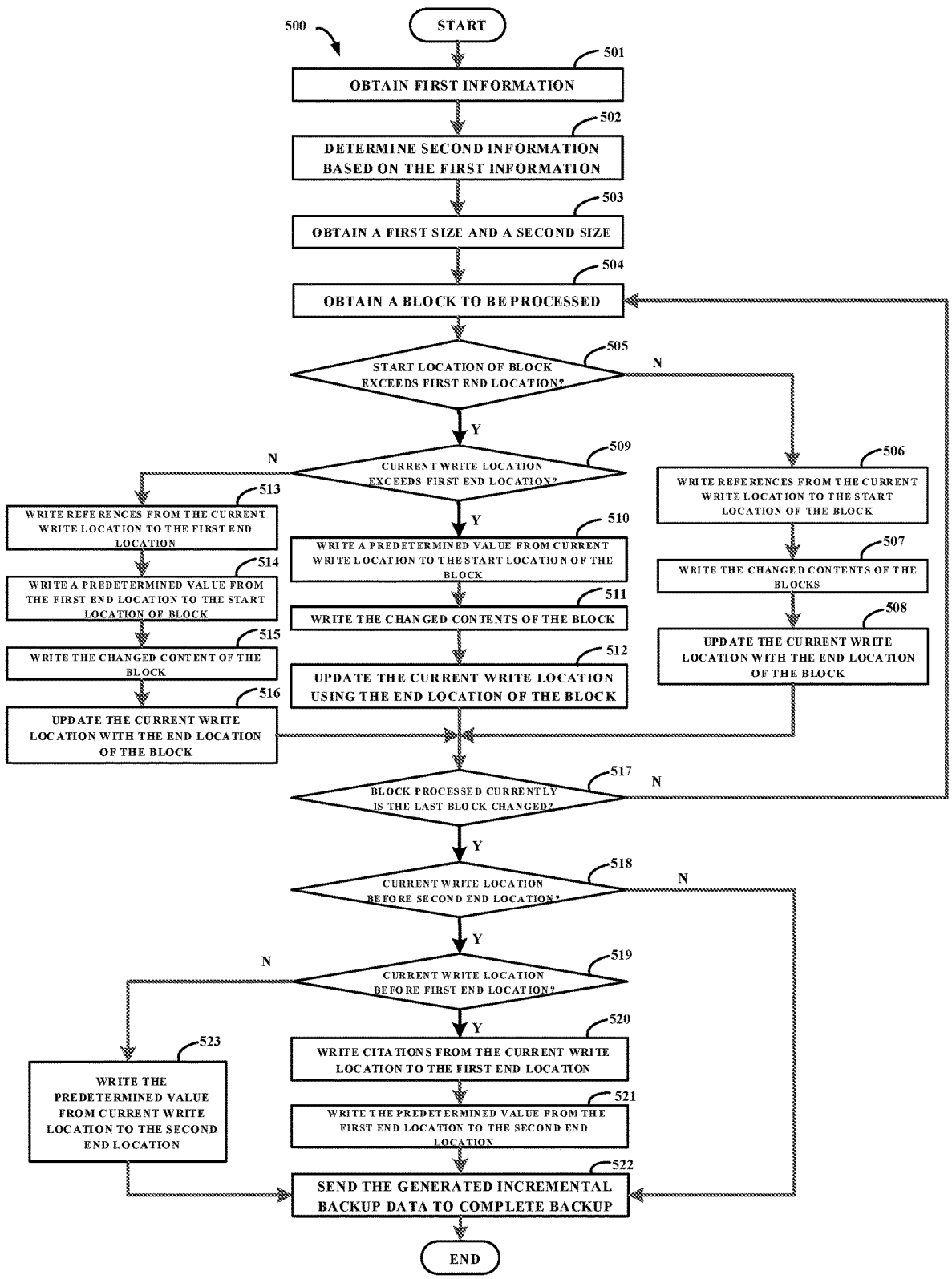
FIG. 5 illustrates a flowchart of a method of backing up data according to embodiments of the present disclosure.

FIG. 5 illustrates a flowchart of a method 500 of backing up data according to embodiments of the present disclosure. For example, the method 500 may be regarded as an implementation of the method 200 and may be carried out by the backup client 120 as shown in FIG. 1. Various acts (or steps) of the method 500 will be described in detail hereinafter with reference to FIG. 1. It would be appreciated that the method 500 may further include additional acts (or steps) not shown and/or may skip the shown acts (or steps), and the scope of the present disclosure will not be limited in this aspect.

At block 501, the backup client 120 obtains first information from the virtual machine system 110. For example, the first information may indicate the blocks in the virtual disk 111 in which the data is changed and may provide the changed contents.

At block 502, the backup client 120 parses the first information to obtain second information about a respective location of the at least one block in the virtual disk 111. For example, the second information may indicate a size of each block in the at least one block changed in the virtual disk 111, a start location and an end location of the block, or the like.

At block 503, the backup client 120 obtains a first size of the virtual disk 111 backed up to the backup server 130 prior to the data change and a second size of the virtual disk 111 subsequent to the data change, and determines a first end location of the virtual disk 111 having the first size prior to the data change and a second end location of the virtual disk 111 having the second size subsequent to the data change.

At block 504, the backup client 120 obtains a block to be processed from the at least one changed block.

At block 505, the backup client 120 determines whether the start location of the block exceeds the first end location.

If the backup client 120 determines, at block 505, that the start location of the block does not exceed the first end location, the method 500 proceeds to block 506, at which the backup client 120 processes unchanged blocks from the current write location of the incremental backup data to the start location of the block. Specifically, for these blocks, the backup client 120 writes the reference to the basic backup data into the incremental backup data.

At block 507, the backup client 120 writes the changed content of the block into the incremental backup data.

At block 508, the backup client 120 updates the current write location of the incremental backup data with the end location of the block. Then, the method 500 proceeds to block 517.

If the backup client 120 determines, at block 505, that the start location of the block exceeds the first end location, the method 500 proceeds to block 509 at which the backup client 120 further determines whether the current write location of the incremental backup data exceeds the first end location.

If the backup client 120 determines, at block 509, that the current write location of the incremental backup data exceeds the first end location, the backup client 120 writes, at block 510, a predetermined value into an area from the current write location to the start location of the block in the incremental backup data.

At block 511, the backup client 120 writes the changed content of the block into the incremental backup data.

At block 512, the backup client 120 updates the current write location of the incremental backup data with the end location of the block. Then, the method 500 proceeds to block 517.

If the backup client 120 determines, at block 509, that the current write location of the incremental backup data does not exceed the first end location, the method 500 proceeds to block 513, at which the backup client 120 processes the unchanged block from the current write location to the first end location of the incremental backup data. Specifically, for these blocks, the backup client 120 writes the reference to the basic backup data into the incremental backup data.

At block 514, the backup client 120 writes the predetermined value into the area from the first end location to the start location of the block in the incremental backup data.

At block 515, the backup client 120 writes the changed content of the block into the incremental backup data.

At block 516, the backup client 120 updates the current write location of the incremental backup data with the end location of the block. Then, the method 500 proceeds to block 517.

At block 517, the backup client 120 determines whether the block processed currently is the last block of the at least one changed block. If the backup client 120 determines that the block processed currently is not the last block of the at least one changed block, the method 500 proceeds to block 504.

If the backup client 120 determines that the block processed currently is the last block from the at least one changed block, the backup client 120 determines, at block 518, whether the current write location of the incremental backup data is before the second end location.

If the backup client 120 determines, at block 518, that the current write location of the incremental backup data is not before the second end location, the method proceeds to block 522, the backup client 120 transmits the generated incremental backup data to the backup server 130, so as to complete backup.

If the backup client 120 determines, at block 518, that the current write location of the incremental backup data is before the second end location, the backup client 120 determines, at block 519, whether the current write location of the incremental backup data is before the first end location.

If the backup client 120 determines, at block 519, that the current write location of the incremental backup data is before the first end location, the backup client 120 processes unchanged blocks from the current write location to the first end location of the incremental backup data. Specifically, for these blocks, the backup client 120 writes the reference to the basic backup data into the incremental backup data.

At block 521, the backup client 120 writes the predetermined value into the area from the first end location to the second end location in the incremental backup data. Then, the method 500 proceeds to block 522.

If the backup client 120 determines, at block 519, that the current write location of the incremental backup data is not before the first end location, the backup client 120 writes, at block 523, the predetermined value into an area from the current write location to the second end location in the incremental backup data. Subsequently, the method 500 proceeds to block 522.

It can be seen from above that the solution of data backup as provided in the example embodiments of the present disclosure may implement incremental backup of a virtual disk with an expandable size, thereby reducing a data amount of backup data for the virtual disk. For the unchanged blocks in the virtual disk, a reference is used to avoid storing duplicate data in a backup server. Because only the changed blocks are processed in the incremental backup, it may shorten the time required for backup and reduce unnecessary data transmission. In a shared networking environment, particularly a cloud-based environment, less data transmission is helpful to reduce the overall expanse of the network.

Figure 6:
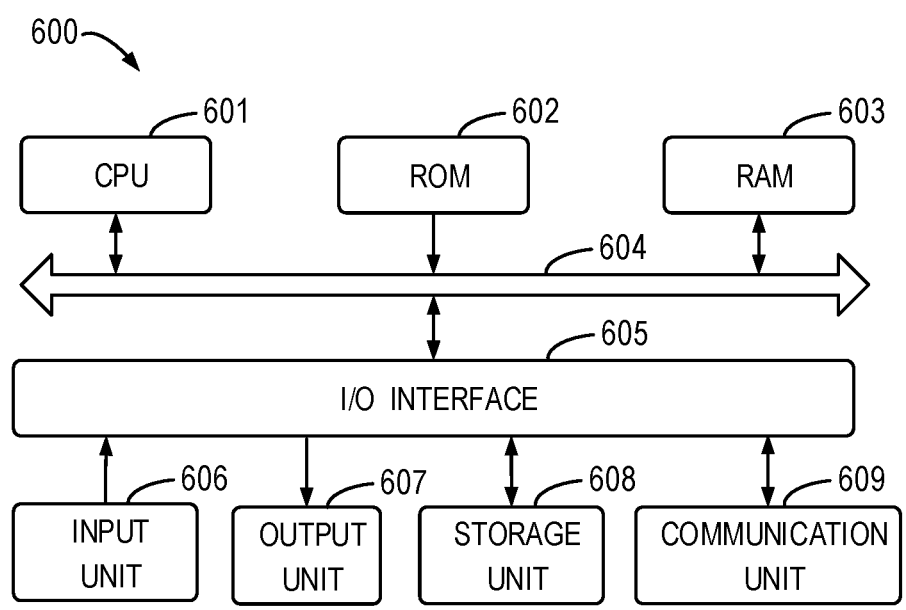
FIG. 6 illustrates a schematic diagram of an example apparatus for implementing embodiments of the present disclosure.

FIG. 6 is a schematic diagram of an example apparatus 600 which may be used for implementing embodiments of the present disclosure. For example, the controller 140 as shown in FIGS. 1, 2 and 4 may be implemented with the example apparatus 600. As shown therein, the apparatus 600 includes a central processing unit (CPU) 601 which may perform, based on a computer program instruction stored in a read-only memory (ROM) 602 or a computer program instruction loaded from a storage unit 608 to a random access memory (RAM) 603, various appropriate acts and processing. The RAM 603 stores therein various programs and data required for operations of the apparatus 600. The CPU 601, the ROM 602 and the RAM 603 are connected with one another via a bus 604. An input/output (I/O) interface 605 is also connected to the bus 604.

The following components in the apparatus 600 are connected to the I/O interface 605: an input unit 606 such as a keyboard, a mouse, or the like; an output unit 607, including various types of displays and loudspeakers, etc.; a storage unit 608, including a magnetic disk, an optical disk, etc.; a communication unit 609, including a network card, a modem, and a wireless communication transceiver, etc. The communication unit 609 allows the apparatus 600 to exchange information/data with other apparatus through a computer network such as the Internet and/or various kinds of telecommunications networks.

Various processes and processing described above, e.g., the method 500, may be executed by the processing unit 601. For example, in some embodiments, the method 500 may be implemented as a computer software program that is tangibly included in a machine readable medium, e.g., the storage unit 608. In some embodiments, part or all of the computer programs may be loaded and/or mounted onto the apparatus 600 via ROM 602 and/or communication unit 609. When the computer program is loaded to the RAM 603 and executed by the CPU 601, one or more acts of the method 500 as described above may be executed.

The present disclosure may be a method, a device, a system, and/or a computer program product. The computer program product may include a computer readable storage medium having computer readable program instructions thereon for causing a processor to carry out aspects of the present disclosure.

The computer readable storage medium may be a tangible apparatus that may retain and store instructions used by an instruction execution apparatus. The computer readable storage medium may be, for example, but is not limited to, an electronic storage apparatus, a magnetic storage apparatus, an optical storage apparatus, an electromagnetic storage apparatus, a semiconductor storage apparatus, or any suitable combination thereof. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination thereof. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals sent through a wire.

Computer readable program instructions described herein may be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing apparatus receives computer readable program instructions from the network and forwards the computer readable program instructions for storage in a computer readable storage medium within the respective computing/processing devices.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In scenario involving the remote computer, the remote computer may be connected to the user's computer through any type of network, including a local area network (LAN) or a wide area network (WAN), or the connection may be made to an external computer (for example, through the Internet using an Internet Service Provider). In some embodiments, electronic circuitry, for example, programmable logic circuitry, field-programmable gate arrays (FPGA) or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart and/or block diagrams of methods, devices (systems), and computer program products according to embodiments of the disclosure. It will be understood that each block of the flowchart and/or block diagrams, and combinations of the blocks in the flowchart and/or block diagrams, can be implemented by computer readable program instructions.

These computer readable program instructions may be provided to a processing unit of a general purpose computer, special purpose computer, or other programmable data processing device to produce a machine, such that the instructions, when executed via the processing unit of the computer or other programmable data processing apparatus, create means for implementing the functions/acts specified in the flowchart and/or block diagram block or blocks. These computer readable program instructions may also be stored in a computer readable storage medium that can direct a computer, a programmable data processing device, and/or other apparatus to function in a particular manner, such that the computer readable storage medium having instructions stored therein includes an article of manufacture including instructions which implement aspects of the function/act specified in the block or blocks of the flowchart and/or the block diagram.

The computer readable program instructions may also be loaded onto a computer, other programmable data processing devices, or other apparatus to cause a series of operational steps to be performed on the computer, other programmable devices or other apparatus to produce a computer implemented process, such that the instructions which are executed on the computer, other programmable devices, or other apparatus implement the function/act specified in the block or blocks of the flowchart and/or the block diagram.

The flowchart and block diagrams in the accompanying drawings illustrate the architecture, functionality, and operation of possible implementations of systems, methods and computer program products according to various embodiments of the present disclosure. In this regard, each block in the flowchart or block diagrams may represent a module, snippet, or portion of code, which includes one or more executable instructions for implementing the specified logical function(s). In some alternative implementations, the functions indicated in the block may also occur in a different order than that indicated in the drawings. For example, two blocks in succession may, in fact, be executed substantially in parallel, or the blocks may sometimes be executed in a reversed order, depending upon the functionality involved. It will also be noted that each block of the block diagrams and/or the flowchart, and combinations of blocks in the block diagrams and/or the flowchart, can be implemented by special purpose hardware-based systems that perform the specified functions or acts, or combinations of special purpose hardware and computer instructions.

The descriptions of the various embodiments of the present disclosure have been presented for illustrative purpose, but are not intended to be exhaustive or limited to the disclosed embodiments. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

We claim:

1. A method of data backup, comprising:
   obtaining first information that indicates changed data in a first block of a plurality of blocks of a local virtual disk, wherein the local virtual disk is an expandable virtual disk;
   determining, based on the first information, a block location of the first block in the local virtual disk;
   obtaining a first size of a backup virtual disk stored on a backup server;
   obtaining a second size of the local virtual disk subsequent to the data change, wherein the first size is smaller than the second size; and
   generating incremental backup data for the local virtual disk, wherein generating the incremental backup data comprises:
      determining, based on the first size, a first end location of the local virtual disk prior to the data change;
      determining, based on the second size, a second end location of the local virtual disk subsequent to the data change;
      generating, for a second block of the plurality of blocks, an indication to fill a corresponding second block of the backup virtual drive with a predetermined value, wherein the second block is located after the first end location; and
      generating the incremental backup data based on the block location, the first end location, and the second end location, wherein the incremental backup data comprises the indication and the changed data.

2. The method of claim 1, further comprising:
   sending the incremental backup data to the backup server.

3. The method of claim 1, wherein the local virtual disk is a virtual disk in a Hyper-V system, and obtaining the first information comprises:
   obtaining, from the Hyper-V system, Resilient Change Tracking (RCT) data relating to the local virtual disk.

4. The method of claim 1, wherein determining the block location comprises:
   determining one selected from the group consisting of a size of the first block, a start location of the first block, and an end location of the first block.

5. The method of claim 1, wherein generating the incremental backup data comprises:
   generating, for a third block of the plurality of blocks, a reference to backup data of a corresponding third block of the backup virtual disk, wherein the third block is located before the first end location, wherein the incremental backup data further comprises the reference.

6. An apparatus for data backup, comprising:
   a processing unit; and
   memory coupled to the processing unit and storing instructions which, when executed by the processing unit, cause the apparatus to perform a method, the method comprising:
      obtaining first information that indicates changed data in a first block of a plurality of blocks of a local virtual disk, wherein the local virtual disk is an expandable virtual disk;
      determining, based on the first information, a block location of the first block in the local virtual disk;
      obtaining a first size of a backup virtual disk stored on a backup server;
      obtaining a second size of the local virtual disk subsequent to the data change, wherein the first size is smaller than the second size; and
      generating incremental backup data for the local virtual disk, wherein generating the incremental backup data comprises:
         determining, based on the first size, a first end location of the local virtual disk prior to the data change;
         determining, based on the second size, a second end location of the local virtual disk subsequent to the data change;
         generating, for a second block of the plurality of blocks, an indication to fill a corresponding second block of the backup virtual drive with a predetermined value, wherein the second block is located after the first end location; and
         generating the incremental backup data based on the block location, the first end location, and the second end location, wherein the incremental backup data comprises the indication and the changed data.

7. The apparatus of claim 6, wherein the method further comprises:
   sending the incremental backup data to the backup server.

8. The apparatus of claim 6, wherein the local virtual disk is a virtual disk in a Hyper-V system, and obtaining the first information comprises:
   obtaining, from the Hyper-V system, Resilient Change Tracking (RCT) data relating to the local virtual disk.

9. The apparatus of claim 6, wherein determining the block location comprises:
   determining one selected from the group consisting of a size of the first block, a start location of the first block, and an end location of the first block.

10. The apparatus of claim 6, wherein generating the incremental backup data comprises:
    generating, for a third block of the plurality of blocks, a reference to backup data of a corresponding third block of the backup virtual disk, wherein the third block is located before the first end location, wherein the incremental backup data further comprises the reference.

11. A non-transitory computer readable medium comprising instructions which, when executed by a processor, enables the processor to perform a method of data backup, the method comprising:
    obtaining first information that indicates changed data in a first block of a plurality of blocks of a local virtual disk, wherein the local virtual disk is an expandable virtual disk;
    determining, based on the first information, a block location of the first block in the local virtual disk;
    obtaining a first size of a backup virtual disk stored on a backup server;
    obtaining a second size of the local virtual disk subsequent to the data change, wherein the first size is smaller than the second size; and
    generating incremental backup data for the local virtual disk, wherein generating the incremental backup data comprises:
       determining, based on the first size, a first end location of the local virtual disk prior to the data change;
       determining, based on the second size, a second end location of the local virtual disk subsequent to the data change;
       generating, for a second block of the plurality of blocks, an indication to fill a corresponding second block of the backup virtual drive with a predetermined value, wherein the second block is located after the first end location; and generating the incremental backup data based on the block location, the first end location, and the second end location, wherein the incremental backup data comprises the indication and the changed data.

12. The non-transitory computer readable medium of claim 11, wherein the method further comprises:

sending the incremental backup data to the backup server.

13. The non-transitory computer readable medium of claim 11, wherein the local virtual disk is a virtual disk in a Hyper-V system, and obtaining the first information comprises:

obtaining, from the Hyper-V system, Resilient Change Tracking (RCT) data relating to the local virtual disk.

14. The non-transitory computer readable medium of claim 11, wherein determining the block location comprises:

determining one selected from the group consisting of a size of the first block, a start location of the first block, and an end location of the first block.

15. The non-transitory computer readable medium of claim 11, wherein generating the incremental backup data comprises:

generating, for a third block of the plurality of blocks, a reference to backup data of a corresponding third block of the backup virtual disk, wherein the third block is located before the first end location, wherein the incremental backup data further comprises the reference.

* * * * *